Nov. 29, 1927.  
P. RING  
AUTOMOBILE HEADLIGHT  
Filed May 21, 1923

1,651,070

INVENTOR  
Paul Ring  
BY  
A. H. Ste Marie  
ATTORNEY

Patented Nov. 29, 1927.

1,651,070

UNITED STATES PATENT OFFICE.

PAUL RING, OF DETROIT, MICHIGAN

AUTOMOBILE HEADLIGHT.

Application filed May 21, 1923. Serial No. 640,394.

This invention relates to ways and means of projecting light in front of an automobile or similar vehicle at night, with a view both to apprising the rider of the condition of the road followed, and warning pedestrians and other travelers of the approach of the conveyance when in motion, or else indicating its presence, if at rest.

Primarily, the invention has for its object to provide an improved method of and device for projecting light for the purposes above set forth, whereby it shall be so controlled as to preclude all glare or any such reflection thereof as would tend to blind or dazzle a person viewing the same.

A secondary object, in providing a headlight of the class referred to, is to supplement the main device by additional lighting means producing a circumambient illumination, available either in conjunction with the principal source of light, or as a substitute therefor, at different times and in diverse conditions.

Other objects and advantages of the invention will in part be obvious and in part be more fully brought out in the detailed description thereof hereinafter contained.

The invention consists of the novel improvements, parts, combinations, and features of construction herein shown and described, and pointed out in the subjoined claims.

In the accompanying drawing,—

Corresponding parts are designated by similar reference characters throughout the several views.

Figure 1:
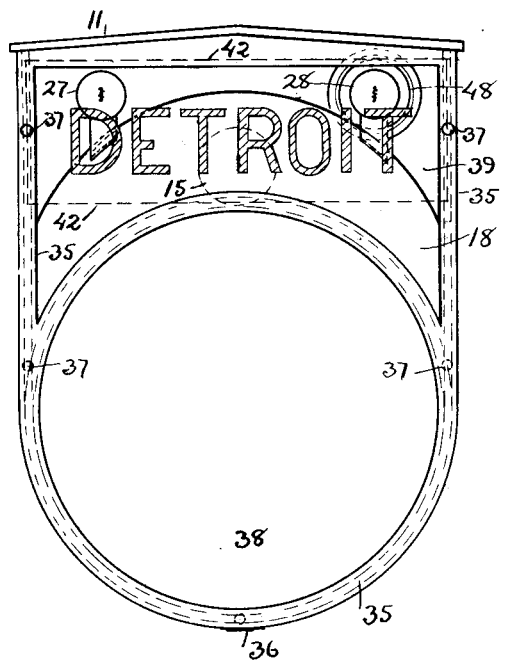
Figure 1 is a front elevation of this improved headlight, illustrating the preferred form of the invention.

The improved headlight constituting the subject-matter hereof includes an outer casing or housing, as 11, designed to contain the source of light, and means for projecting the rays therefrom so that they will be seen in a diffused state, exteriorly. As shown, the housing 11 may have a rounded bottom, substantially straight sides, and a slightly arched top. However, any other suitable type of casing or housing may be employed, that will accommodate the several parts of the invention. The form of housing exemplified in the drawing admits of being made with light material, such for instance as aluminum, or similar sheet-metal. No special means for mounting the housing in its customary location on the forward part of an automobile are illustrated herein, as this may be done in any approved manner, without affecting the principle of the invention. Only, the drawing shows the housing as provided with a pair of rearwardly disposed lugs 12, which may be used in attaching it to a bracket or other rigid support that will hold it firmly on the automobile.

In the upper central part of the said housing is placed a lamp 15, preferably of the incandescent electric filament type. This lamp may be of any desired candle-power, although some carefully conducted tests have demonstrated that the present invention gives satisfactory results with an electric light of comparatively low voltage, such as is produced by current derived from secondary batteries of known description. The lamp 15 constitutes the principal source of light in the embodiment of the invention herein illustrated.

Over the lamp 15 aforesaid is placed a shielding member 18, of curved formation, disposed transversely of the outer casing 11, and extending forwardly and downwardly from the rear to the front thereof, a relatively narrow space being left, as at 19, between the rear margin of the said member and the back wall of the housing. It will be noticed that, owing to this manner of setting the member 18, the lamp 15 cannot be seen exteriorly of the casing, except by stooping and looking in from points beneath the member's front margin, assuming that the housing is placed at the accustomed height on the automobile. The main source of light, consequently, is hidden from view in normal conditions. The underside of the member 18 may be polished or faced with radiant material, if desired, in which case it will act as an inverted reflector, serving to focus or concentrate the light emitted by the upper and forward parts of the lamp, and to direct the reflected rays into the interior of the housing, downwardly. The curvature of the shielding member or inverted reflector, as shown, may be twofold, that is, exist both longitudinally and in a transverse direction.

Below the lamp above referred to, and its overlying shield, is set a plane-surfaced element 22, placed on an incline, extending downwardly and forwardly from the space 19, before mentioned, to the bottom of the housing, in front. This element may consist of a plate of polished brass, or equivalent material, and is intended to diffuse the light shed thereon directly and indirectly by the lamp 15, and the shielding member or inverted reflector located thereabove. It will be observed by referring particularly to Fig. 2, that the light-diffusing element 22 is so positioned relatively to the lamp 15 and the shielding member 18, that no rays from either of them can be diverted outwards above the front margin of the said member. All the light impinging upon the plane surface of the diffusing element is deflected outwardly thereby either in a horizontal or in a downward direction, as plainly shown by the two sets of lines 23 and 24, composed of dashes, which respectively indicate the angles of incidence and reflection of the light cast upon the said element. As a consequence, the light is carried out in a broad sheaf, corresponding to the width of the diffusing element, which thus operates to illuminate the roadway ahead of the automobile, at a low elevation from the ground, but sufficiently to guide the chauffeur and at the same time signal the approach of the vehicle to others, without that dangerous glare ever present in numerous forms of headlights heretofore employed.

Figure 2:
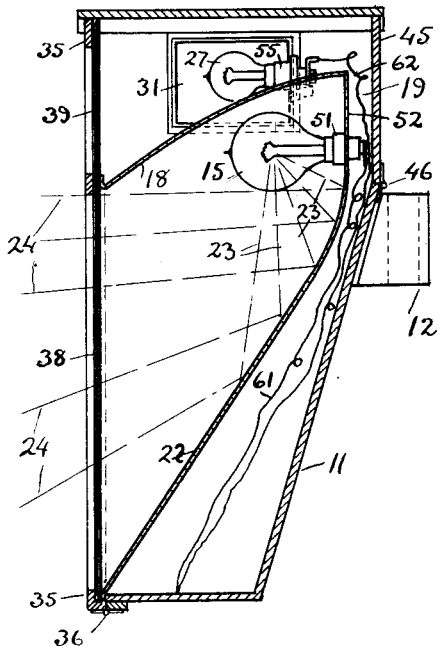
Fig. 2 is a vertical section of the same, taken from the center of the preceding figure, a certain part being omitted.
Figure 4:
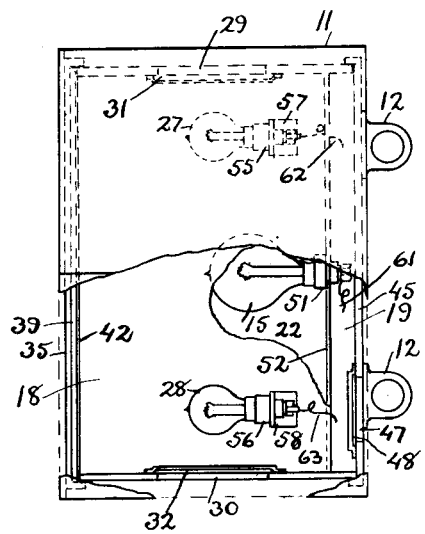
Fig. 4 is a top plan view, broken at different levels, likewise to disclose the internal structure.

The shielding member 18, hereinabove described, serves to divide the top portion from the rest of the housing 11, and forms an upper compartment therein, which is utilized for the reception of supplementary or substitute lamps, as 27 and 28, also of the incandescent electric denomination. These lamps are of smaller size and lower power than the lamp 15, previously mentioned, and are preferably placed one to the right and the other to the left of the shielding member, within the said compartment. As represented in Fig. 1, both of the small lamps 27, 28 can be seen from the front of the housing, one by each side of the curved surface of the member 18. The same lamps are further arranged to shed light laterally of the housing, through side openings 29 and 30, one of which is provided for each, as indicated in Figs. 2 and 4. The openings are closed normally by small planes 31 and 32, of glass or translucent material, either plain or colored. The lamp bulbs may be colored instead of the panes, if preferred. In practice, it is deemed advisable to show one of the side lights colored red, while the other may be of the plain kind. The colored light is then available to signal the chauffeur's intention to make a turn, for instance when about to steer the automobile around a street corner, and the plain light can be reserved for use in parking the vehicle. Assuming that two headlights are provided, as usual, on the opposite sides of the automobile, the outer side light is the one preferably to be colored, while that on the inner side may remain unchanged, giving the ordinary clear rays. It is understood that the main lamp 15 may be cut out of the electric circuit, whenever the supplementary or substitute lamps 27, 28 are lighted.

A transparent closure is provided for the front of the housing, to protect the interior thereof and the enclosed parts from weather influences, and generally to safeguard the same against injury from external causes of various sorts. This closure may be of plain glass set in a light frame, as 35, arranged to swing upwardly from a hinge 36, at the bottom of the housing, and held to the forward edges of the latter by screws 37. The glass in the frame preferably includes a circular pane 38, covering the space comprised between the rounded bottom of the housing and the front margin of the inverted reflector 18, and another pane 39, extending opposite the housing's upper compartment, at its forward extremity.

Besides the glass pane 39, just spoken of as being positioned forwardly thereof, the said upper compartment is also fitted with a dimmer plate 42, of translucent or semitransparent material, adapted to transmit a subdued light from the supplementary or substitute lamps 27 and 28. The plate 42 may be loose, that is removable, and held in place by the glass frame 35 and the adjacent edges of the housing 11, as shown in Figs. 1 and 4. This light-subduing plate may further be utilized to display the trade name of the automobile, or the number of its license plate, or some advertising matter, the word "Detroit" apearing in Fig. 1 of the drawing being merely suggestive as to what can thus be displayed.

Figure 3:
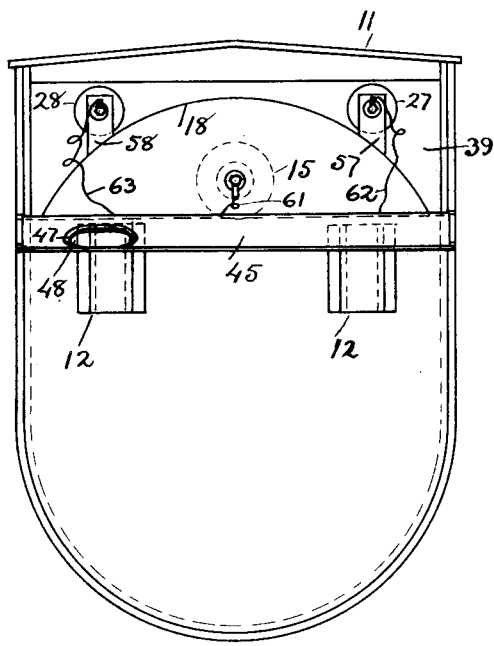
Fig. 3 is a rear elevation, with the housing of the headlight partly open, to show the interior arrangement.

Access may be had to the interior of the housing from the rear thereof, through a transverse opening made in its upper portion and normally closed by a shutter 45, best seen in Figs. 2 and 3. Preferably, this shutter is fitted so as to swing downwardly upon hinges, as 46, to which its bottom edge is attached. It may be held in closed position by any suitable means, for instance by screws (not shown) similar to those employed on the front closure, previously described. A sight aperture 47, covered by a small glass pane 48, preferably colored red, is further provided in the shutter 45 (Figs. 1, 3 and 4) to allow the light in the upper compartment of the housing to be seen from the rear by the driver of the automobile. This enables the driver to determine at a glance whether the lamps 27 and 28 are lighted, or either of them, and in what condition they may be, without opening the housing to make a special investigation or inspection.

The before described lamp 15 is removably inserted, in the usual manner, into a socket 51, secured to an extension 52, of the light-diffusing element 22. The extension 52 is preferably made integral with this element and set in a substantially vertical plane parallel to the shutter 45, within the space shielded by the curved member 18 in front. Thence the element 22 dips forwardly and downwardly, as previously described and exemplified in Fig. 2. The base of the lamp is thus brought close to the shutter 45, which acts as a steadying means for the same, a proper insulation being provided between the lamp, its base and mounting, and the shutter to prevent grounding or short-circuiting of the electric current.

Similarly, the lamps 27 and 28 are detachably held in sockets 55 and 56, firmly secured to brackets 57 and 58, provided for them in the upper compartment of the housing. As appears in the drawing, these brackets may rest upon the surface of the inverted reflector or shielding member 18.

All of the electric wires, as 61, 62 and 63, employed in connection with the lamps 15, 27 and 28, can be led to them through the rear part of the housing, behind the light-diffusing element 22 and its extension 52, as illustrated in the drawing. However, it is understood that such wiring may be of any suitable description, and arranged in any convenient manner.

Having now described my invention, what I claim, and desire to secure by Letters Patent of the United States, is:

1. A headlight including a housing with a light-transmitting opening in the front thereof, a main lamp in the central portion of said housing normally invisible at the level of the upper edge of said opening, a reflector over said lamp serving to divide said portion from the upper part of said housing so as to form a separate compartment in the same, said compartment having oppositely located light-transmitting apertures at the sides, said reflector being upwardly curved midway between said apertures, and auxiliary lamps intermediate the latter and each side of the reflector, said auxiliary lamps being capable of use either conjointly with or independently of said main lamp.

2. A headlight including a housing provided with front and rear openings, an electric lamp mounted with its base turned toward the rear opening in the central part of said housing, a shield extending across the latter over said lamp downwardly to the front opening, auxiliary electric lamps mounted between the front and rear openings above said shield, wiring for all of said lamps connected to the same within the housing in the back portion thereof, and a hinged shutter to the rear opening permitting access therethrough to the several lamps and the wiring, said shutter having a sight aperture enabling it to show whether or not said auxiliary lamps are lighted, and the shutter further acting to steady said lamp base.

3. The combination of a housing open in front, an inclined reflector extending upwardly across the interior of said housing from the front toward the rear thereof so as to divide it into superposed compartments, a closure over said front provided with separate openings arranged to transmit light from said compartments respectively, transparent panes in said openings, an inscription-bearing translucent dimmer plate set in juxtaposition to the upper one of said panes, said plate being held in place by said closure against adjacent parts of the housing, a lamp positioned below said reflector so that its under side will normally be invisible at or above the level of the upper edge of the lower pane, and another lamp mounted to cast its rays directly over the reflector's surface and upon the inscription-bearing plate.

4. The combination of a housing having an open front with substantially straight sides and a rounded lower portion, a closure for said front provided with a circular opening opposite said lower portion and a separate aperture thereabove reaching approximately to the top of the housing, transparent panes in both said opening and said aperture, an inverted reflector consisting of a centrally raised member extending upwardly from the dividing line between the opening and the aperture into the interior of the housing intermediately of said panes, a lamp under said reflector normally invisible at or above the level of its forward edge, other lamps above the reflector's surface by each side of its raised center, and an inscription-bearing translucent dimmer plate disposed transversely of said surface between the upper pane and said other lamps.

5. A vehicle headlight comprising a housing having an open front wall formed arcuate at its lower edge; an arcuate rib extending across said wall for framing with the lower edge a circular opening in said wall; an arcuate reflector curved from side to side of said housing and terminating at its forward edge at said rib and inclined upwardly therefrom toward its rearward edge; a lamp positioned in said housing beneath said reflector and entirely above the forward edge thereof, said lamp being invisible on a horizontal plane, tangent with the lower edge of said rib; and a pair of lamps positioned in said housing above said reflector, one adjacent each side thereof and serving to direct rays of light laterally and forwardly from said housing, said housing having openings formed in its opposite sides for passage of said light rays therethrough and a translucent closure for said front wall above said rib.

6. A vehicle headlight comprising a housing having an open front wall; a translucent closure for said front wall; an arcuate reflector curving from side to side of said housing mounted in said housing adjacent its upper end and curved to incline upwardly towards its rearward edge, the forward edge of said reflector terminating in close proximity to said closure for dividing said housing into a pair of compartments; a lamp mounted in the lowermost of said compartments and concealed entirely from view on a horizontal line of vision by the forward edge of said reflector; a pair of lamps positioned in the upper compartment of said housing, one adjacent each side of said reflector and directing the light rays laterally and forwardly relatively to said housing, said lamps being visible from the front of said housing on horizontal lines of vision, each of the side walls of the upper compartment having an opening formed therein for the passage of light rays therethrough.

PAUL RING. [L. S.]